Patented July 24, 1923.

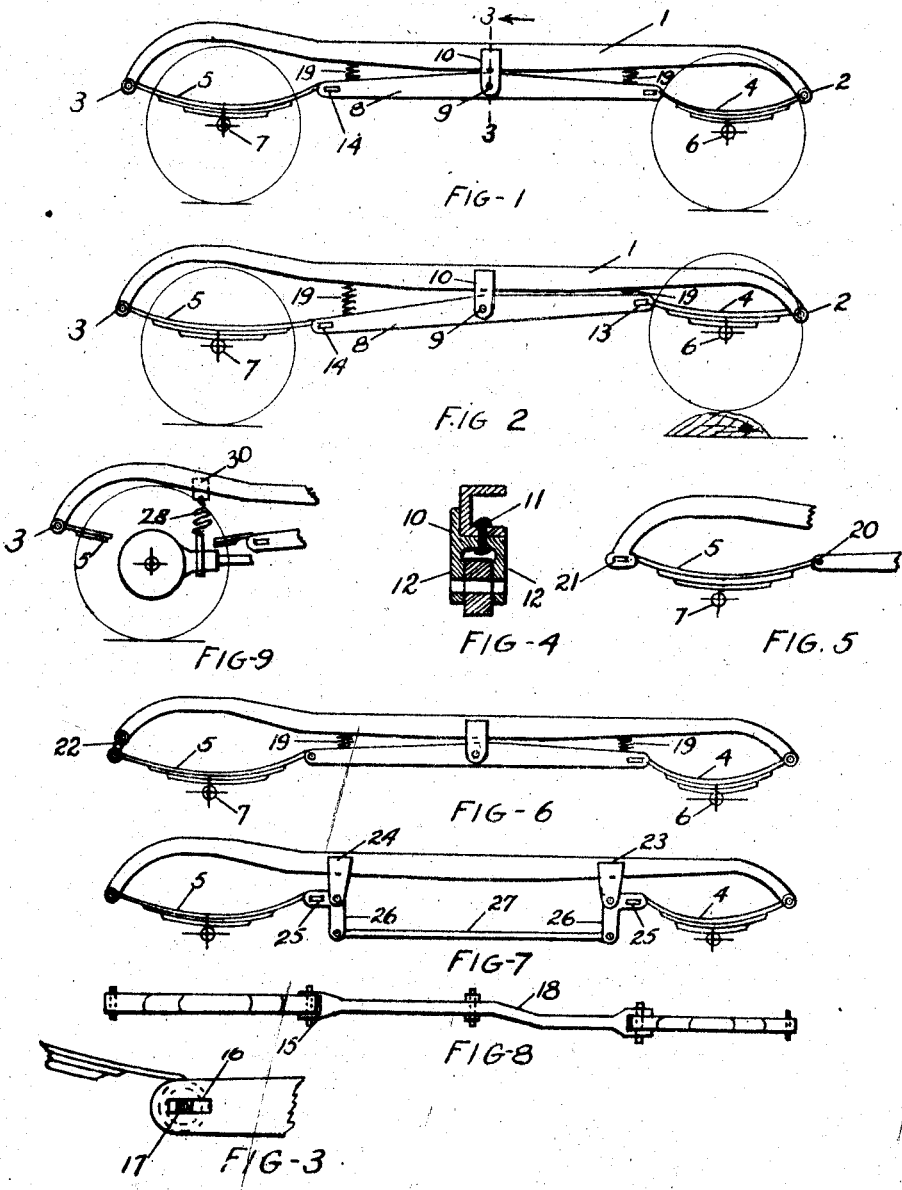

1,462,638

UNITED STATES PATENT OFFICE.

WILLIAM J. HACKETT, OF RENO, AND FRED T. ABBAY, OF HAZEN, NEVADA.

AUTOMOBILE SPRING EQUALIZER AND SHOCK ABSORBER.

Application filed October 9, 1922. Serial No. 593,269.

*To all whom it may concern:*

Be it known that we, WILLIAM J. HACKETT and FRED T. ABBAY, citizens of the United States, and residents, respectively, of Reno, county of Washoe, and Hazen, county of Churchill, of the State of Nevada, have invented a new and useful Automobile Spring Equalizer and Shock Absorber, of which the following is a specification.

This invention relates to a new and useful automobile spring equalizer and shock absorber and is designed more particularly for vehicles which are self-propelled, such as automobile trucks and pleasure cars. It is applicable generally to that type of car employing as a part of its suspension means leaf springs extending rearwardly from the front axle and forwardly from the rear axle, and more particularly to that type employing at the front and rear of the car, semi-elliptical or cantilever springs secured to or pivoted on the front and rear axles.

In these types, in all constructions that are in actual use, of which we are aware, the ends of the springs are connected to the chassis at the front and rear in consequence of which all shock absorption by the springs at either end of the car is confined to the capacity of the spring at that end.

It is the object of this invention to utilize both springs to absorb the shock at either end, thereby increasing the riding qualities of the car and effecting other advantageous results as stated below. The object is accomplished by connecting the rear end of the front spring and the front end of the rear spring in such manner as to suspend the chassis, communicate positively and without substantial lost motion the vertical movement of one spring relative to the chassis in an opposite direction to the other, and permit the proper setting of the springs. This is the essence or principle of this invention.

This application is a continuation in part of our application, Ser. No. 525,042 filed December 27, 1921.

The invention may be embodied in various forms, some of which are hereinafter described and shown in the accompanying drawings for purposes of a clear explanation of the principle involved, but it is to be understood that this principle is capable of embodiment in other forms not shown. The means employed in the best forms in which we contemplate applying the principle requires but little change in existing car constructions of the type referred to above while other forms in which it may be embodied require greater changes.

We will now describe the preferred embodiment and some of the alternative forms, reference being made to the accompanying drawings and letters of reference thereon to make the description clear.

In the drawings:

Fig. 1 is a side elevation of the preferred form of the invention.

Fig. 2 illustrates the position occupied by the parts when the front wheel strikes an elevation in the roadway.

Fig. 3 is a detailed view showing a preferred connection of the equalizer bar and spring.

Fig. 4 is a cross-sectional view taken on line 3—3 of Fig. 1 looking in the direction of the arrow.

Fig. 5 is a side elevation of a modified construction employed at the rear of the car.

Fig. 6 is a side elevation of still another form employed at the rear of the car.

Fig. 7 is a side elevation of another embodiment of the invention.

Fig. 8 is a bottom plan view of springs and equalizer bar showing a modified form of the equalizer bar.

Fig. 9 is a side elevation illustrating a different application of a stabilizing spring, hereinafter fully described.

Referring first to the preferred form of embodiment shown in Figs. 1, 2, 3, and 4, the frame or chassis 1 of the car has pivoted thereto at the front and rear ends by suitable bolts 2 and 3 the outer ends of the semi-elliptical springs 4 and 5 which are supported in the usual manner intermediate their ends on the axles 6 and 7.

An equalizer bar 8 is pivotally supported intermediate its ends by any suitable bearing as indicated at 9, of the antifriction type if desired, on a bracket or casting 10 connected in any appropriate way to the chassis. This bracket may be of any form but as shown it consists of a metallic member comprising parts arranged at right angles, one of such parts resting against the outer face of the ordinary U-shaped channel bar of the chassis frame, the other part extending beneath the channel bar, being secured thereto by suitable bolts 11, and having two depending flanges 12 between which the equalizer bar is pivoted, whereby the equalizer bar is positioned beneath the chassis bar. The equalizer bar is preferably snugly fitted between the flanges 12 in order to prevent any substantial side play. The particular means described for pivoting the equalizer bar, however, is not essential and may be changed in accordance with the relative positions and proportions of the parts of the construction with which the equalizer bar cooperates. The opposite ends of the equalizer bar are pivotally connected with the adjacent ends of the springs, as indicated at 13 and 14 in such manner that the vertical motion of the spring relative to the chassis at one end will be communicated positively to the opposite spring without substantial lost motion whereby one spring automatically and immediately responds to the action of the other. In the embodiment shown in Figs. 1 to 4 it is necessary that there shall be lost motion at the pivotal connections 13 and 14 in a longitudinal direction to permit the necessary action of the springs but that there shall be substantially no relative vertical motion of the parts at the joints. This may be accomplished in various ways, but as shown in Fig. 1, and in detail in Fig. 3, the ends of the equalizer bar are provided with bifurcations 15 (see Fig. 8) which receive and preferably snugly fit the adjacent ends of the springs, the bifurcations having registering slots 16 within which fit blocks 17 preferably of hardened steel, connected in any suitable way to the ends of the springs. The blocks fit closely in the slots in order that the motion of one spring may be communicated positively to the opposite spring and to prevent noise or rattling. The length of the slot is such as to permit the necessary motion of the blocks therein incident to flexure of the springs and to provide for slight variations in the dimensions of the cars or springs to which the invention is to be applied. If it were desirable to modify the ordinary construction of the semi-elliptical springs, the slots might be located in the spring and the blocks be mounted in the equalizer bar; or any other form of pivotal and sliding connection operating in the prescribed manner may be adopted.

The equalizer bar is ordinarily pivoted to the chassis at approximately its central portion and about midway between the front and rear axles, but the relation of the parts in this respect depends upon the distribution of the weight of the car and will be varied as will be readily understood by those skilled in the art.

The disposition of the equalizer bar relative to the chassis and the shape of the equalizer bar is dependent upon the type of car in which the invention is used. Ordinarily the equalizer bar will be arranged on a plane below the chassis, and when employed with front and rear springs which are not in alinement, it will be provided with an offset as shown at 18, Fig. 8.

Fig. 5 shows a modification of the construction shown in Fig. 1 wherein the front end of the rear spring is pivoted by a bolt to the end of the equalizer bar, as indicated at 20, the rear end of the frame 1 is modified in form, and a slot 21 is provided at the end thereof which receives a sliding block pivotally connected to the end of the spring, the pin-and-slot construction being substantially the same as that shown in Fig. 3. This arrangement is a reversal of that shown in Fig. 1, in that the direct pivotal connection is between the equalizer bar and the front end of the spring, and the pin-and-slot connection is between the chassis and rear end of the spring.

Fig. 6 shows another modification similar to that shown in Fig. 5, wherein there is a direct pivotal connection between the front end of the rear spring and the equalizer bar and a lost motion connection between the rear end of the spring and the chassis consisting of the usual shackles as indicated at 22.

In the forms of embodiment above described a single bar substantially centrally pivoted to the chassis is employed. In Fig. 7 an embodiment is shown which, while not considered as simple and probably not as efficient as the forms above described, nevertheless embodies in a usual way the principle of the invention. In this form the outer ends of the front and rear semi-elliptical springs 4 and 5 are directly pivoted to the ends of the chassis. Supported by the chassis and depending therefrom adjacent the inner ends of the springs 4 and 5 are brackets 23 and 24 to which are pivoted bell crank levers each having short arms, one arm 25, in each case, extending toward and being pivoted to the adjacent end of a spring. The other arm 26, of each bellcrank, extends downwardly, and these downwardly extending arms are connected by a rod 27. The pivotal connections of the bellcranks with the brackets 23 and 24 and of the arms 26 with the rod 27 are of the ordinary bolt-and-eye type, but the connections of the arms 25 with the adjacent ends of the semi-elliptical springs are of a type which permits of a slight longitudinal sliding motion to permit setting of the springs but without substantial vertical play in the joint, as in the constructions above described, and as shown, they are of the pin-and-slot type illustrated in Fig. 3.

The embodiments of our invention described above and illustrated in Figs. 1 to 5 provide an operative device, but in order to give better support and more stability to the chassis and car body it is desirable to use a spring or springs interposed between some part which moves with or under the action of the springs 4 and 5 and the chassis. One spring alone may be employed in which case we have found it best to place it between the differential housing and a cross member 30 of the chassis, as indicated in Fig. 9. But we have found it best to employ four springs interposed between the ends of the equalizer bar and chassis. These springs are preferably of the coiled type and preferably both tension and compression springs, secured positively to the chassis and equalizer bar or other moving part, whereby, when the parts move beyond normal in one direction they are put under tension and are compressed in case of movement beyond normal in the opposite direction. These springs are designated by the numeral 19 in Figs. 1, 2, and 6 and by the numeral 28 in Fig. 9. The embodiments of the invention shown in Figs. 1 to 5 are operative without such a spring, but in the embodiments shown in Fig. 6 a spring or springs or their equivalent is essential.

Operation: The action of the construction depicted in Fig. 1 when an elevation in the roadway is encountered, is shown in Fig. 2 which shows the front wheel in contact with an elevation in the roadway. In such event the front wheel is thrust upwardly, flattening the spring and consequently putting it under compression, simultaneously forcing it bodily upwardly. The upward motion is at once communicated to the front end of the rear spring forcing it downwardly and putting it under stress. Under these circumstances the chassis moves very slightly, if any, the shock being taken up by the two springs, in consequence of which the automobile body maintains a substantially horizontal position at all times. The action of the springs arising from the wheels meeting a depression in the road is substantially the reverse with the same effect on the body of the car. In this case, however, when the front wheel, for example, is temporarily relieved from the weight of the car body, the tension of the front spring tends to force the wheel into the depression. As soon as this motion begins the same is transmitted immediately to the rear spring through the equalizer bar which restrains the action of the front spring and prevents the front wheel from dropping quickly, in consequence of which shocks are greatly lessened; this action takes place at both front and rear.

The operation of the other forms is the same.

The advantages flowing from this invention are many, among which the following appear to be the most important: The riding qualities of the car are improved to a remarkable extent; breakage of springs and frame is greatly lessened; racking and warping of the body and doors is greatly minimized. A very important advantage results from the application of that embodiment of our invention shown in Fig. 1 to a car of the Hotchkiss type which includes probably over seventy-five per cent of car constructions. In the Hotchkiss type the only connection between the rear axles and body are the rear springs, no torque rod being used as in other types. It is, therefore, necessary for the springs, in the Hotchkiss type, to take care of the torque action resulting from starting and stopping and to transmit the motion of the axle to the chassis and body. In such a construction, should one of the rear springs break on the road, it is practically put out of commission, whereas, with our equipment, there still remains a connection between axle and chassis sufficient to drive the car, whether the breakage occurs in the front or rear portion of the rear spring.

While we have described the best form in which we now contemplate embodying our invention, and some alternative forms, it is to be understood that the invention may be modified in ways other than those described, and our claims, appended hereto, are intended to cover all forms within the principle above set forth.

What we claim is:

1. In a device of the character described, in combination, front and rear axles of an automobile, a chassis, a spring suspension therefor including leaf springs extending rearwardly from the front axle and forwardly from the rear axle, means supported on the chassis intermediate the front and rear axles and having connection with the rear end of the front spring and front end of the rear spring and adapted to permit the necessary flexing of the springs and positively to communicate substantially all vertical motion of the inner end of either spring relative to the chassis to the other in an opposite direction.

2. In a device of the character described, in combination front and rear axles of an automobile, leaf springs supported thereby, a chassis, pivotal connection between the chassis and springs at the front and rear, means supported on the chassis intermediate the front and rear axles and having connection with the rear end of the front spring and with the front end of the rear spring and adapted to permit the necessary flexing of the springs and positively to communicate substantially all vertical motion of the inner end of either spring relative to the chassis to the other in an opposite direction.

3. In a device of the character described, in combination, front and rear axles of an automobile, leaf springs supported thereby, a chassis, a pivotal connection between the forward end of the front spring and the chassis, equalizing means pivotally supported on the chassis intermediate the front and rear axles, a substantially horizontal lost motion pivotal connection between the rear end of the front spring and the equalizing means, pivotal connections between the rear end of the rear spring and chassis and the front end of the rear spring and equalizing means, one of the two last mentioned connections being a substantially horizontal lost motion connection, the two lost motion connections permitting a proper setting of the springs but positively transmitting the vertical motion of either spring relative to the chassis in an opposite direction to the other spring.

4. In a device of the character described, in combination, front and rear axles of an automobile, leaf springs supported thereby, pivotal connections between the springs and chassis at the front and rear, equalizing means pivotally supported on the chassis intermediate the front and rear axles and having substantially horizontal lost motion pivotal connection with the adjacent inner ends of the springs, whereby the vertical motion of either spring relative to the chassis is positively communicated in an opposite direction to the other.

5. In a device of the character described, in combination, front and rear axles of an automobile, leaf springs supported thereby, pivotal connections between the springs and chassis at the front and rear, equalizing means pivotally supported on the chassis intermediate the front and rear axles and having pin-and-slot connections with the adjacent inner ends of the springs.

6. In a device of the character described, in combination, front and rear axles of an automobile, leaf springs supported thereby, a chassis, a pivotal connection between the forward end of the front spring and chassis, an equalizer bar pivotally supported on the chassis intermediate the front and rear axles, a substantially horizontal lost motion pivotal connection between the front end of the equalizer bar and the rear end of the front spring permitting limited longitudinal play of the connected parts without substantial relative vertical motion, pivotal connections between the rear end of the rear spring and chassis and the front end of the rear spring and the equalizer bar, the latter connection having the characteristic that it permits substantially no vertical play in the joint, and one of the said two last mentioned connections having a lost motion permitting flexure of the spring.

7. In a device of the character described, in combination, front and rear axles of an automobile, leaf springs supported thereby, a chassis, a pivotal connection between the forward end of the front spring and chassis, an equalizer bar pivotally supported on the chassis intermediate the front and rear axles, a pivotal connection between the front end of the equalizer bar and the rear end of the front spring permitting limited longitudinal play of the connected parts without substantial relative vertical motion, pivotal connections between the rear end of the rear spring and chassis and the forward end of the rear spring and the equalizer bar, the latter connection having the characteristic that it permits substantially no vertical play in the joint, and one of the said two last mentioned connections having lost motion permitting a relative longitudinal motion of the connected parts without substantial relative vertical motion.

8. In a device of the character described, in combination, front and rear axles of an automobile, leaf springs supported thereby, a chassis, a pivotal connection between the forward end of the front spring and chassis, an equalizer bar pivotally supported on the chassis intermediate the front and rear axles, a pivotal connection between the front end of the equalizer bar and the rear end of the front spring permitting limited longitudinal play of the connected parts without substantial relative vertical motion, pivotal connections between the rear end of the rear spring and chassis and the front end of the rear spring and the equalizer bar, the latter connection having the characteristic that it permits substantially no vertical play in the joint, and one of the said two last mentioned connections comprising a pin-and-slot.

9. In a device of the character described, in combination, front and rear axles of an automobile, leaf springs supported thereby, a chassis, a pivotal connection between the forward end of the front spring and chassis, an equalizer bar pivotally supported on the chassis intermediate the front and rear axles, a pivotal connection between the front end of the equalizer bar and the rear end of the front spring permitting limited longitudinal play of the connected parts without substantial relative vertical motion, pivotal connections between the rear end of the rear spring and chassis and the front end of the rear spring and the equalizer bar, the latter connection having the characteristic that it permits substantially no vertical play in the joint, and one of the said last two mentioned connections having a lost motion permitting flexure of the spring, and spring means interposed between the chassis and a part which moves with and under the action of the leaf springs.

10. In a device of the character described, in combination, front and rear axles of an automobile, leaf springs supported thereby, a chassis, a pivotal connection between the forward end of the front spring and chassis, an equalizer bar pivotally supported on the chassis intermediate the front and rear axles, a pivotal connection between the front end of the equalizer bar and the rear end of the front spring permitting limited longitudinal play of the connected parts without substantial relative vertical motion, pivotal connections between the rear end of the rear spring and chassis and the front end of the rear spring and the equalizer bar, the latter connection having the characteristic that it permits substantially no vertical play in the joint, and one of the said last two mentioned connections having a lost motion permitting flexure of the spring, and springs interposed between the ends of the equalizer bar and the chassis.

11. In a device of the character described, in combination, front and rear axles of automobile, leaf springs supported thereby, a chassis, a pivotal connection between the forward end of the front spring and chassis, an equalizer bar pivotally supported on the chassis intermediate the front and rear axles, a pivotal connection between the front end of the equalizer bar and the rear end of the front spring permitting limited longitudinal play of the connected parts without substantial relative vertical motion, pivotal connections between the rear end of the rear spring and chassis and the front end of the rear spring and the equalizer bar, the latter connection having the characteristic that it permits substantially no vertical play in the joint, and one of the said last two mentioned connections having a lost motion permitting flexure of the spring, and coil springs interposed between the ends of the equalizer bar and the chassis.

12. In a device of the character described, in combination, front and rear axles of an automobile, leaf springs supported thereby, a chassis, direct pivotal connection between the front and rear parts of the chassis and the springs, an equalizer bar pivotally supported by the chassis intermediate the front and rear axles, and pivotal connections between the ends of the equalizer bar and the adjacent ends of the springs having provision for lost motion permitting longitudinal play between the connected parts but preventing substantial vertical play thereof, whereby the vertical motion of one spring relative to the chassis is communicated directly and positively in an opposite direction to the adjacent end of the other spring.

13. In a device of the character described, in combination, front and rear axles of an automobile, leaf springs supported thereby, a chassis, direct pivotal connections between the front and rear parts of the chassis and the springs, an equalizer bar pivotally supported by the chassis intermediate the front and rear axles, and pivotal connections between the ends of the equalizer bar and the adjacent ends of the springs having provision for lost motion permitting longitudinal play between the connected parts but preventing substantial vertical play thereof, whereby the vertical motion of one spring is communicated directly and positively in an opposite direction to the adjacent end of the other spring, and springs interposed between the ends of the equalizer bar and chassis.

14. In a device of the character described, in combination, front and rear axles of an automobile, leaf springs supported thereby, a chassis, direct pivotal connections between the front and rear parts of the chassis and the springs, an equalizer bar pivotally supported by the chassis intermediate the front and rear axles, and pin-and-slot connections between the ends of the equalizer bar and the adjacent ends of the springs.

15. As an accessory for automobiles provided with front and rear leaf springs supporting the ordinary chassis, an equalizer bar adapted to be pivotally connected at an intermediate point to an intermediate point of the chassis and of a length and with suitable provisions at its opposite ends, adapting it to be directly pivotally connected to the adjacent ends of the springs with a lost motion between the connected parts in a longitudinal direction but without vertical motion thereof.

16. As an accessory for automobiles provided with front and rear leaf springs supporting the ordinary chassis, an equalizer bar having slots at opposite ends and adapted to be pivotally connected at an intermediate point to an intermediate point of the chassis, such equalizer bar being of a length such that when placed in position the slots may receive pivot bolts connected to the adjacent ends of the springs.

17. As an accessory for automobiles provided with front and rear leaf springs supporting the ordinary chassis, an equalizer bar having slots at opposite ends and adapted to be pivotally connected at an intermediate point to an intermediate point of the chassis, such equalizer bar being of a length such that when placed in position the slots may receive pivot bolts connected to the adjacent ends of the springs, and a bracket pivotally connected to an intermediate part of the equalizer bar and adapted for attachment to an automobile chassis.

Signed at Sparks, in the county of Washoe and State of Nevada, this 14th day of Sept., 1922.

WILLIAM J. HACKETT.
FRED T. ABBAY.

Witness:
W. R. SHABER,